United States Patent [19]

Popeil

[11] 4,112,127

[45] Sep. 5, 1978

[54] METHOD FOR PROCESSING AND FILLING A DOUGH PRODUCT

[75] Inventor: Samuel J. Popeil, Chicago, Ill.

[73] Assignee: Popeil Brothers, Inc., Chicago, Ill.

[21] Appl. No.: 703,918

[22] Filed: Jul. 9, 1976

[51] Int. Cl.² .............................................. A21D 8/02
[52] U.S. Cl. ...................................... 426/283; 426/92; 426/502; 426/517
[58] Field of Search ...................... 426/92, 94, 95, 105, 426/138, 274, 275, 279, 280, 282, 283, 502, 503, 504, 512, 517, 111; 425/335, 357, 363, 374

[56] References Cited

U.S. PATENT DOCUMENTS

| 94,227 | 8/1969 | Maltby | 425/363 |
|---|---|---|---|
| 777,349 | 12/1904 | Mitchell | 425/363 |
| 1,814,485 | 7/1931 | Moss | 426/283 |
| 2,386,993 | 10/1945 | Valdastri | 426/283 |
| 2,479,864 | 8/1949 | Rhodes | 426/502 |

*Primary Examiner*—Raymond N. Jones
*Assistant Examiner*—Elizabeth A. Hatcher
*Attorney, Agent, or Firm*—Dominik, Knechtel, Godula & Demeur

[57] ABSTRACT

A dough processor is disclosed in which a pair of parallel rollers are geared for coacting space relationship to pass a predetermined amount of dough therebetween. Means are provided to adjust the spaced relationship between the rollers, and in fixed dimensional relationship each to the other so that firm spacing takes place as the dough is repeatedly processed between the rollers. A preferred ratchet type mechanism for adjusting the space between the rollers is provided. Gear reduction for the handle permits use by the average homemaker, and optionally the same may be power driven.

The method contemplates the steps of sequentially and repeatedly passing the preformed amount of dough through the rollers, and adjusting the space closer and closer until the desired thickness is achieved. Thereafter the thus flatened dough is placed over a mold having upstanding cutting edges, the rollers spaced to pass the mold in cutting edge contact with the upper roller, and the mold is passed therethrough and the finished product removed.

2 Claims, 13 Drawing Figures

U.S. Patent  Sept. 5, 1978  Sheet 1 of 3  4,112,127
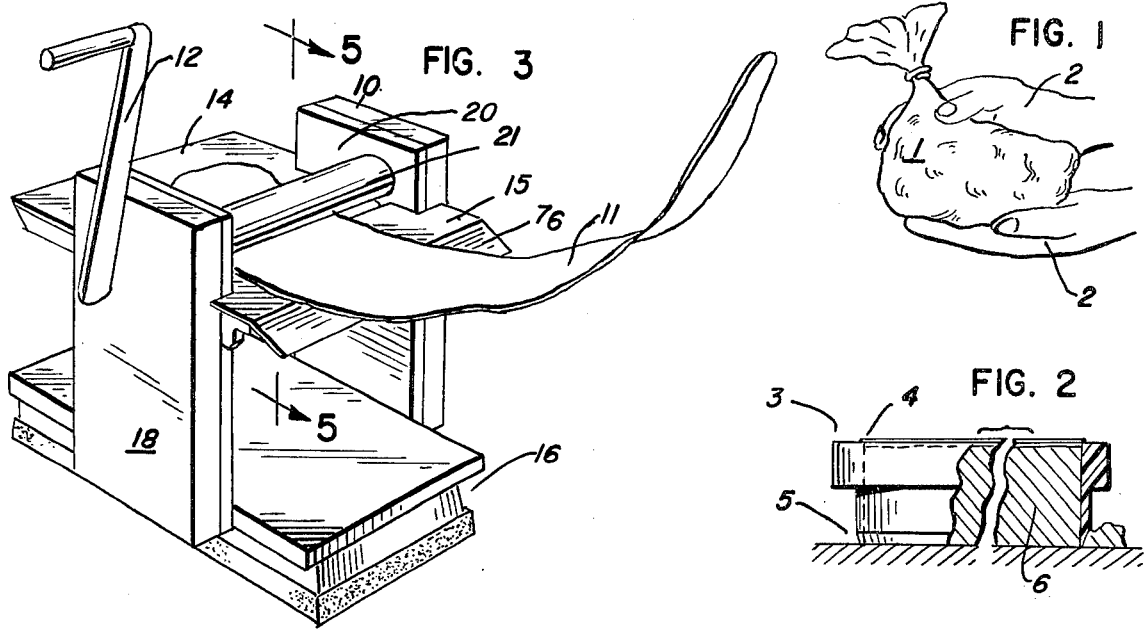
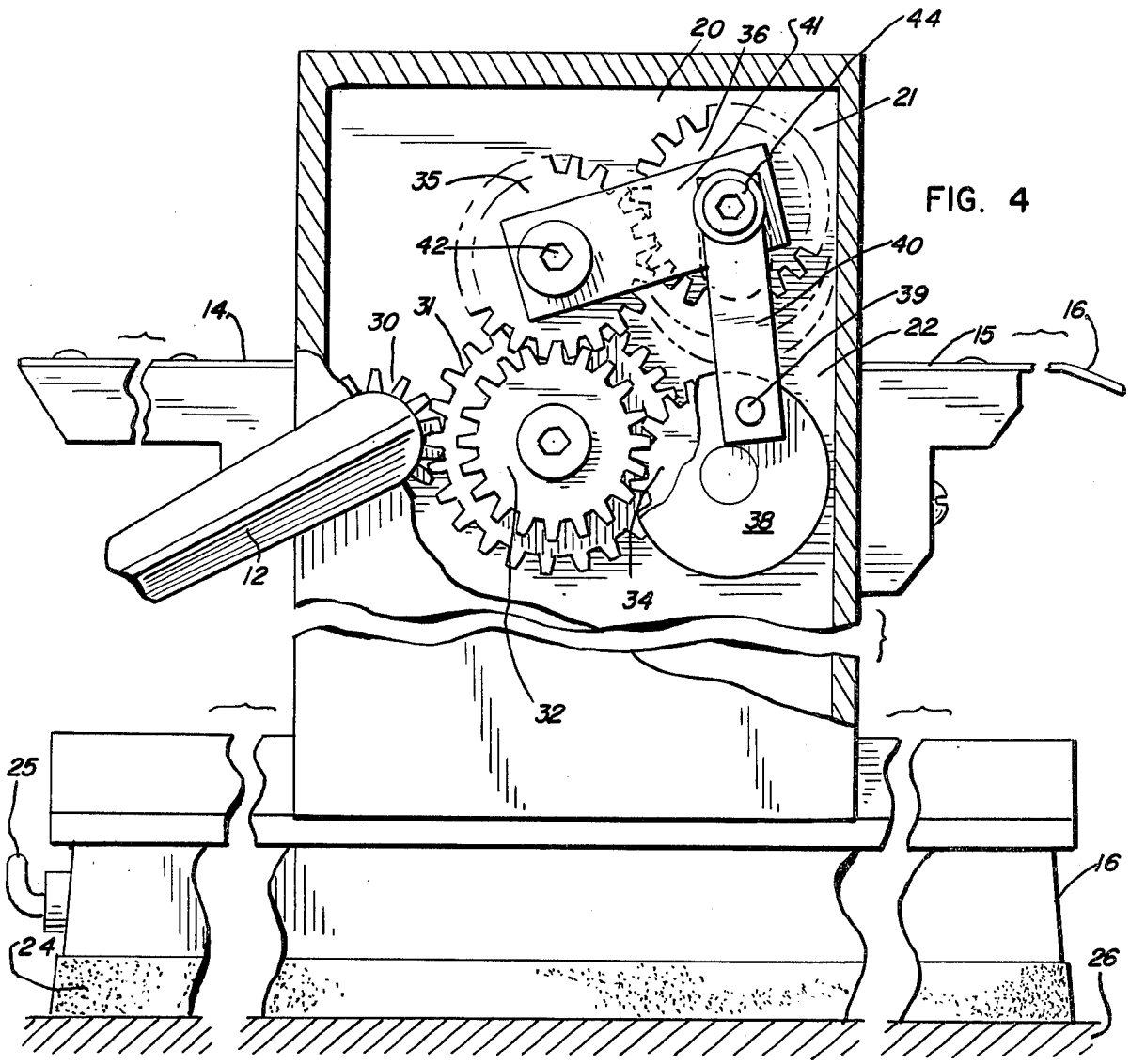

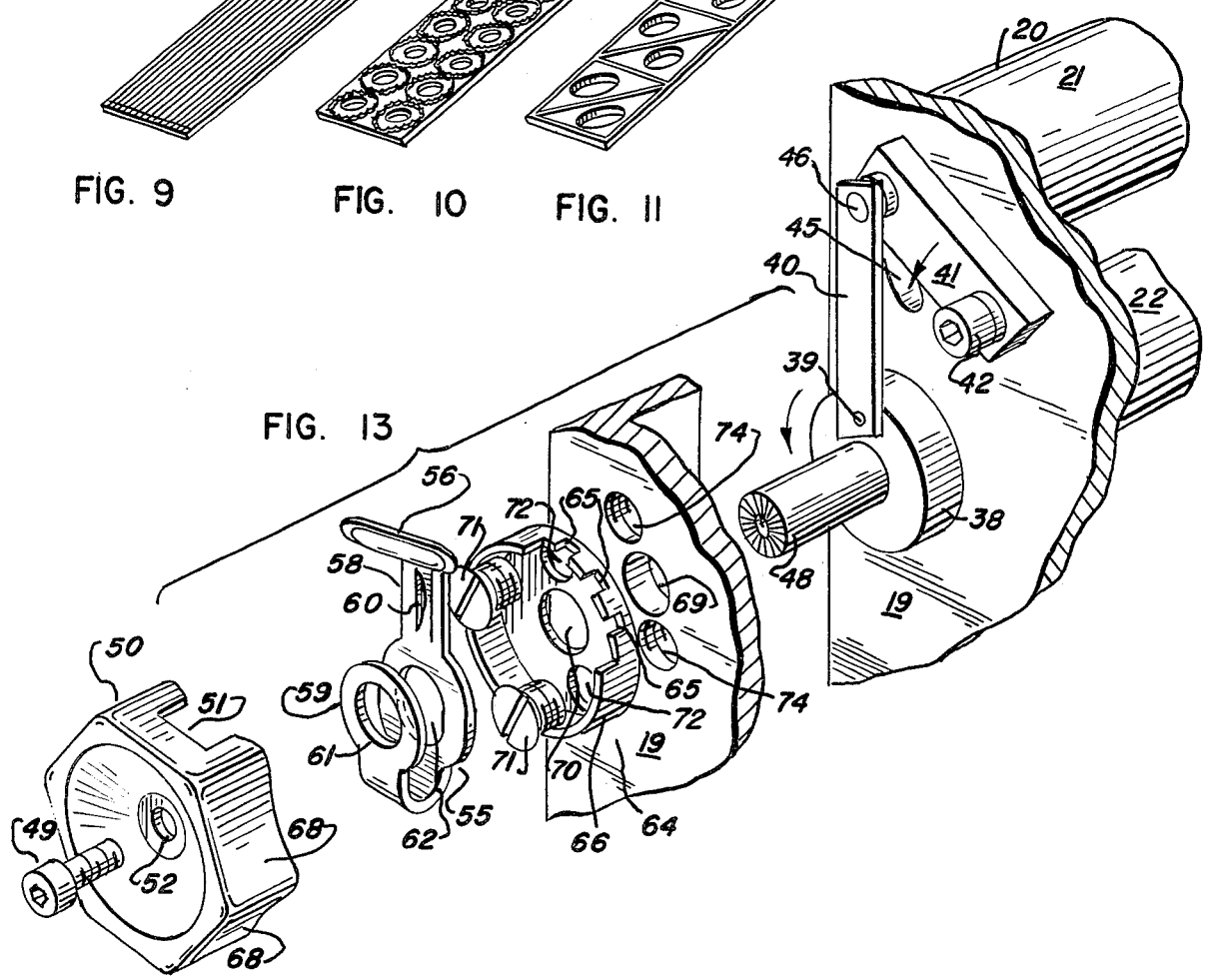

METHOD FOR PROCESSING AND FILLING A DOUGH PRODUCT

FIELD OF INVENTION

The present invention relates to the processing of dough type products, and more particularly dough suitable for making into noodles, ravioli, and the like. Both the apparatus in the form of proposed driven rollers, and the method find particular utility in the making of ravioli and noodles.

SUMMARY OF THE PRIOR ART

Heretofore the homemaker has made ravioli and noodles with a rolling pin, laboriously rolling the dough until a proper consistency is believed reached. Thereafter the same is placed on an open faced mold with upstanding cutting edges, and the rolling pin passed thereover to cut the product to shape.

With the method and apparatus of the prior art, it is difficult if not impossible to apply uniform pressure to the dough on both sides of the rolling pin. Furthermore, the dough must be repositioned and folded and brought beneath the rolling pin to prepare a pattern that will adequately fit the mold.

In addition, while passing the rolling pin over the dough or the mold, there is no insurance of uniform consistency both as to dimension and porosity.

SUMMARY OF INVENTION

The method of the present invention is directed to mixing of a preselected amount of dough and kneading the same to a uniform consistency, and thereafter feeding the predetermined quantity between opposed pairs of spaced rollers with a preselected fixed dimension between the same, and processing and reprocessing the dough through the rollers until it is flat and dimensionally stable. Thereafter the rollers are positioned in even closer proximity, and reprocessing takes place until dimensional stability is achieved.

Thereafter the dough is positioned atop an open face mold having upstanding cutting edges, the rollers repositioned to pass the open face mold therethrough in cutting edge contact, the mold then being passed through the rollers and the excess dough stripped off and the finished product removed for further processing.

The apparatus contemplates a pair of opposed rollers, both of which are interconnected for power drive means to rotate the same. In the hand driven model a ratio of two turns of the hand crank to one turn of the rollers is provided. The upper roller is preferably coated with a texturized material to provide additional feeding and driving force. In the preferred embodiment a ratchet type readjustable means with preselected positions thereon is utilized so that several spaced positions may be entered into and the rollers spaced apart from each other in such a fashion. The ratchet means and the rollers are so constructed that the dimensional stability between the two and more particularly the opening therebetween is relatively rigid to thereby continually compress the processed dough with a uniform dimensional stability.

DESCRIPTION OF THE DRAWINGS

Further objects and advantages of the present invention will become apparent as the following description proceeds, taken in conjunction with the accompanying drawings in which:

FIG. 1 shows diagrammatically the means for preparing the dough in a plastic bag and kneading by hand.

FIG. 2 is a partially cut away transverse view of the dough blank mechanism.

FIG. 3 is a perspective view of the formed dough being passed repeatedly through the rolling apparatus.

FIG. 4 is an enlarged partially broken front view of the crank portion of the rolling apparatus disclosed in FIG. 3.

FIG. 9 illustrates an alternative form of mold for making noodles.

FIG. 10 illustrates a further embodiment of the mold for making cookies.

FIG. 11 illustrates still a further alternative embodiment mold for making tarts.

FIG. 12 is an enlarged transverse sectional view of the roller apparatus taken along section line 12—12 of FIG. 7.

FIG. 13 is an enlarged exploded perspective view of the drive and space adjusting mechanism with selectively positions the spaced relationship of the rollers.

THE METHOD

Figure 5:
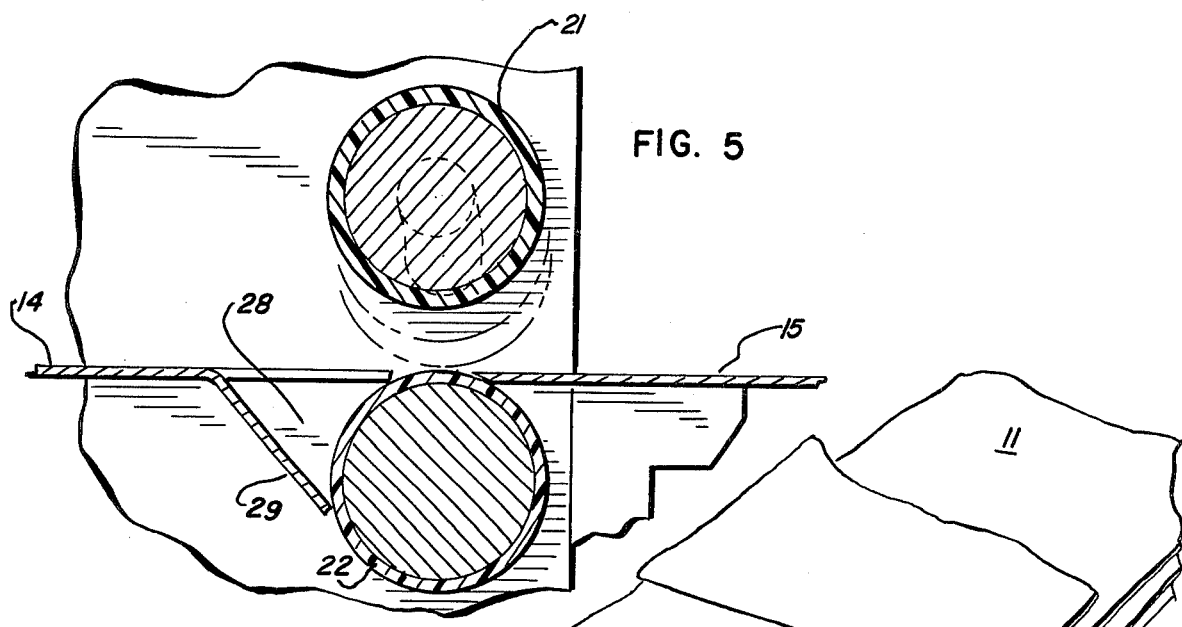
FIG. 5 is an enlarged partially diagrammatic transverse sectional view taken along section line 5—5 of FIG. 3 illustrating the spaced relationship between the rollers and the table means for feeding and discharging the dough.

The operational and mechanical details of the dough processor 10 will be better understood after a full description of the method employed. The method begins with placing the recipe for dough batter in a dough bag 1, as shown in FIG. 1. A typical recipe provides for a mixture of three large chicken eggs and two cups of all-purpose pre-sifted flour. Desirably a "pinch" of salt may be added. Thereafter the dough bag 1 is kneaded by the hands 2 of the homemaker. Mixing and kneading should take place until such time as the batter reaches a relatively stable consistency. Thereafter a dough slug 6 or dough blank 6 is cut by means of the blank cutter 3. In FIG. 2 it will be seen that the blank cutter 3 has a lower knife edge 5 and an upper knife edge 4. After the dough slug 6 is filled to overflow inside the blank cutter 3, the same may be passed through the roller assembly 20 of the processor 10 in its mold engaging configuration. This causes the dough blank 6 within the blank cutter 3 to be firmly compressed therein, and the size determined with a degree of accuracy much greater than can be done by hand, with a knife, or through other techniques.

Thereafter the dough slug 6 is fed between opposed rollers 21, 22 in the roller assembly 20 repeatedly to form the dough strip 11 as illustrated in FIG. 3. This process is repeated by running the dough strip 11 through the roller assembly 20 until it attains dimensional stability. This can generally be observed by noting a smooth face on one portion of the dough strip 11, and that after passing through the roller assembly 20 it will not rebound or spring back to a greater thickness. Optionally the same may be reprocessed at closer spacings of the roller assembly 20, but desirably the same is continually processed until the dough strip 11 reaches a thickness of approximately 0.040 inches or 3/64 inch.

Care must be taken in mixing the dough as, if it is too moist, the strip will have a ripple or washboard effect. In addition, it will tend to cling to the rollers 21, 22. Alternatively, if the dough is too dry, problems will occur in the processing of ravioli squares, tarts, and the like because the edges will not seal adequately.

After the dimensionally stable dough strip 11 is achieved, the same is positioned on an open face mold having upstanding cutting edges designed to form the final food product. Optionally, two strips 11 may be placed over the mold, with ravioli meat therebetween, or in the case of a jelly filled cookie, and a second dough strip 11 placed thereatop. In any of these alternatives, the open face mold is thereafter passed through the roller assembly 20 in the same fashion as the blank cutter 3, and the pressure of the rollers will seal the edges of the food product and cut the discreet items to a point where they can be readily removed from the open face mold by inverting the same and applying light finger pressure.

THE DOUGH PROCESSOR

Referring now to FIG. 3, it will be seen that the processor 10 includes a crank 12 which activates the roller assembly 20 to pass the dough strip 11 across a feed table 14 onto a discharge table 15. The entire assembly is mounted on a base support 16 and the roller assembly 20 is proportioned to span the space between the crank side roller support 18 and the adjustment side roller support 19. As noted in FIG. 5, there is an upper roller 21 and a lower roller 22. The upper roller 21 preferably has a textured surface 80 as shown in FIG. 12, with the lower roller surface 81 being essentially smooth. The entire processor 10 is supported on a suction base 23 (see FIG. 4) which is activated by a base crank 25 in order to securely but removably engage the same with the countertop 26.

Again, as noted in FIG. 5, the spaced rollers 21, 22 are positioned between a feed table 14 and a discharge table 15. Provision is made for a feed chute 28 having a feed chute bottom 29 which is an extension of the feed table 14. The purpose of the feed chute 28 is to provide a backup or reservoir space for the dough strip 11 or the dough slug 6 to be fed into the position between the upper and lower rollers 21, 22. To be noted is the close relationship between the discharge table 15 where its edge is immediately adjacent the lower roller 22. As will be pointed out hereinafter, the lower roller 22 is fixed in its relationship to the feed table 14 and discharge table 15, but the upper roller 21 may be raised or lowered to vary the spaced relationship between it and the lower roller 22.

The drive assembly for powering both rollers 21, 22 is shown in FIG. 4. There it will be seen that the original transmission passes from the crank gear 30 which is secured to the crank 12 onto a control gear 31 which is drivingly secured to the roller drive gear 32. The roller drive gear 32 is in meshing relationship with the lower roller gear 34. The upper roller control gear 35 is driven by the lower roller drive gear 32. It, in turn, meshes with the upper roller gear 36. Thus, as the crank 12 is rotated, a direct drive geared relationship is set into motion which causes the upper roller and lower roller 21, 22 to counter-rotate, and desirably rotate once for each two rotations of the crank 12, thus providing a high level of mechanical advantage to the roller assembly 20.

Important to the operation of the processor 10 is the provision for varying the space in the roller assembly between the upper roller 21 and the lower roller 22. This mechanism shown in part in FIGS. 4 and 12 is illustrated in the exploded perspective view of FIG. 13, wherein it will be seen that a spacer crank 38, here shown as a wheel-like member, including a spacer crank pin 39 and spacer link 40 are activated by means of a spacer shaft 48. The spacer link 40 operates the pivot arm 41 which is secured by means of a pivot pin 42 to a portion of the housing for the processor 10. At its opposite end, the pivot arm 41 is secured by means of a spacer link pin 46 to the spacer link 40. On one side of the upper roller 21 it will be seen that a spacer link pin 46 is employed, whereas on the other side (see FIG. 4) a roller pin and bolt 44 are provided. Varying means for securing the linkage are contemplated, and the invention is independent of any specific type pivot. The effect of the spacer link 40 coacting through the activation of the spacer crank 38 and the pivot arm 41 is to pass the upper roller end shaft 82 (see particularly FIG. 12) upwardly and downwardly through the guide slot 45. Thus, by rotating the spacer shaft 48 by means of the spacer knob 50 which is secured to the spacer shaft 48 by means of the spacer shaft bolt 49, the spaced relationship between upper roller 21 and lower roller 22 can be varied. It has been found in operation, however, that it is desirable to eliminate a yieldable relationship between the upper roller 21 and lower roller 22, and rather provide for fixed spacing. To this end, the spacer knob 50 is provided with its related elements to the end that a digital type spacing may be achieved, as described hereinafter.

The spacer knob 50 is provided with a spacer knob key 51 in one portion of the finger grip recesses 68, and the knob 50 is secured to the end of the spacer shaft 48 by means of the bolt 49 passing through the knob bolt hole 52. A spacer crank 55 having a "J" shaped body portion comprising a finger tab leg 58 and knob leg 59 is positioned coaxially over the spacer shaft 48 with the latter passing through the tab leg shaft hole 61 and the knob leg shaft hole 62. A notch key 60 is formed out of the finger tab leg 58 and may be inserted in the lock cup notches 65 by means of grasping the finger tab 56 and releasing and repositioning the notch key 60 in various ones of the lock cup notches 65. The lock cup 64 is secured to the housing of the processor 10 by means of the cup bolts 71 passing through the cup bolt hole 72 and threadedly engaged in the cup bolt mounting holes 74. The cup shaft hole 70 is provided centrally for the spacer shaft 48 to pass therethrough. The spacer shaft 48 passes also through the shaft hole 69 in the housing of the food processor 10. As noted, three lock cup notches 65 are provided in the lock cup wall 66. This has been found an ideal number, but it will be appreciated that four or five, or as few as two, notches may be provided. In the latter situation, one position will be for passing the open face mold through the roller assembly 20 and the other will be for passing the dough strip 11 repeatedly through the roller assembly 20 until the forming and baking consistency is achieved. The spacer crank 55 coacts with the spacer shaft 48 in much the same fashion as an angled washer on a door closer when it holds the same in the open position. Since there is essentially no load on the mechanism apart from its own weight, when the finger tab 56 is grasped by the user and retracted into the spacer knob key 51, the table shaft leg hole 61 and knob leg shaft hole 62 (as shown in FIG. 12) jammingly engage the shaft 48, and along with the action of the knob 50 being secured to the shaft 48 by means of bolt 49, rotate the crank 38 and set the spacer mechanism into motion to reposition the upper roller 21 in relationship to the lower roller 22.

Additional details of the upper roller 21 and lower roller 22 will be observed in FIG. 12 where it will be seen that the lower roller end shafts 75 are hollow, to accommodate the passage therethrough of the spacer shaft 48 which is secured to the cranks 38 at its opposite ends. As noted, the upper roller surface 80 is textured. Various materials may be employed for the upper roller such as neoprene, cycolac or delrin, or other food approved resilient outer surfaces. The lower roller surface 81 is preferably smooth, and where economy is of no concern, both the upper roller surface 80 and lower roller surface 81 may be formed of stainless steel or like metallic material. For household use, however, the plastics are preferred. The upper roller end shaft 82 may be solid and, as observed, passes through the guide slot 45 as it is moved upwardly and downwardly in spaced relationship to the lower roller 22.

Figure 6:
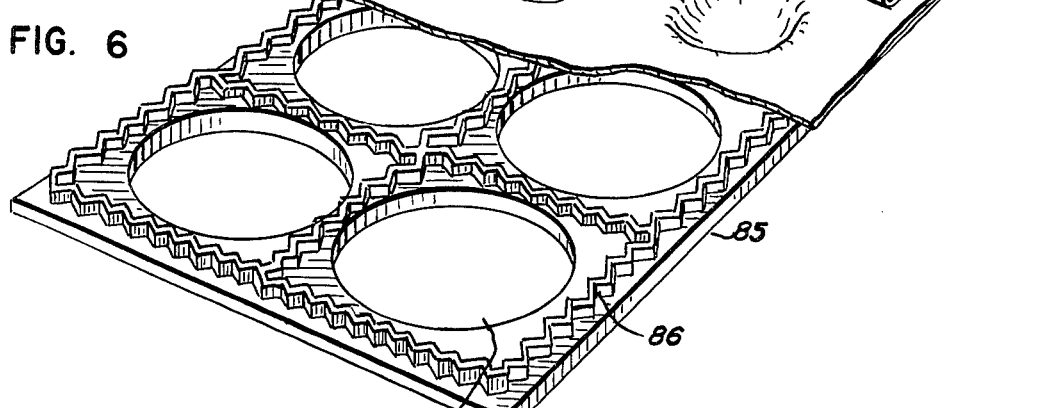
FIG. 6 is a perspective view of a typical mold used in connection with the invention prepared for the making of ravioli.
Figure 8:
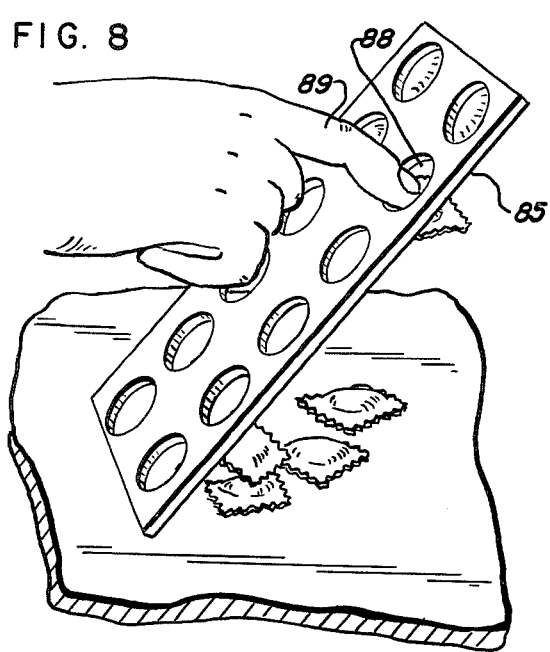
FIG. 8 is a perspective view illustrating diagramatically how the thus formed dough product is removed from the mold.
Figure 7:
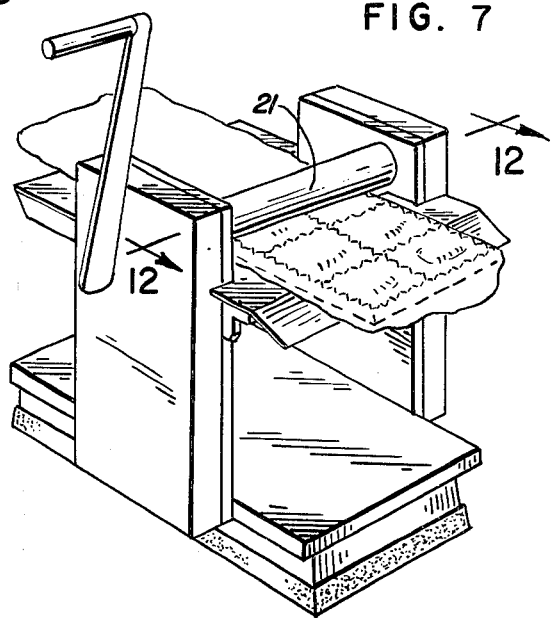
FIG. 7 illustrates in perspective form how the mold of FIG. 6 is passed through the roller apparatus.

Turning now to FIG. 6, the ravioli mold 85 will be seen which is a long flat open-ended element, preferably formed of metal although suitable plastics are available. The ravioli mold 85 includes a plurality of seal knife edges 86 as shown, in this instance scalloped, and positioned to provide a grid. The drop holes 88 are provided for the two-fold purpose of receiving the ravioli meat 91 and removing the ravioli squares 90 by means of the finger 89 as shown in FIG. 8. A noodle mold 92, as shown in FIG. 9, may also be used with a single dough strip 11, having a plurality of noodle knife sealing edges 94. The tart mold 95 is provided with a plurality of triangular sections all bounded by seal knife edges 96. In addition, a filled cookie mold 98 which may be used to form jelly filled and other filled cookies is provided with a plurality of circular scalloped knife seals 99.

While dimensions are not critical, it is highly desirable to provide the closest spaced relationship between the upper roller 21 and lower roller 22 so that the dough, after reaching dimensional stability, has a thickness of approximately 40/1,000 inch or 3/64 of an inch. In addition, the upper position or the greatest spaced relationship, such as shown in FIG. 12, where the ravioli mold is passing between the upper roller 21 and lower roller 22, is 7/16 inch.

Although particular embodiments of the invention have been shown and described in full here, there is no intention to thereby limit the invention to the details of such embodiments. On the contrary, the intention is to cover all modifications, alternatives, embodiments, usages and equivalents of a dough processor and method as fall within the spirit and scope of the invention, specification and the appended claims.

What is claimed is:

1. A method of processing dough comprising the steps of:
   mixing the dough in a preselected quantity and kneading the same until a uniform consistency is achieved,
   preforming the dough by providing an open ended blank cutter and filling it to overflow with dough,
   thereafter passing the dough fill and blank cutter between a pair of opposed rollers to form a preformed blank having a compressed predetermined quantity and predetermined uniform configuration of dough,
   removing the dough from the blank cutter,
   feeding the preformed dough between the pair of opposed rollers which are in fixed rigid spaced relationship to each other thereby compressing the same,
   reprocessing the dough by again passing the dough through the pair of opposed rollers until flat and dimensionally stable in the thickness dimension,
   repositioning the rollers to a closer spacing,
   reprocessing the dough again repeatedly between the rollers until flat and dimensionally stable in the thickness dimension,
   positioning the flattened dough body on an open faced mold having upstanding cutting edges designed
   to form the final food product,
   repositioning the rollers to accommodate passing the open faced mold in cutting edge relationship,
   passing the mold containing the dough through the repositioned rollers thereby severing the dough,
   removing the thus formed dough product
   whereby one set of rollers through repositioning the same are utilized to reprocess the dough until the desired thickness is obtained, and the same rollers pass the dough in cutting relationship when placed on an open faced mold, and dough products having various configurations with substantially flat surfaces are readily formed and can be further processed by baking, or drying.

2. The method of claim 1 comprising,
   placing a first strip of the thus formed dough over an open faced ravioli mold,
   depressing the center of each portion of dough strip over a ravioli section,
   filling each portion with ravioli filling,
   placing a second dough strip atop the first,
   and passing the thus prepared mold through a roller assembly to seal and cut the ravioli sections.

* * * * *